(12) United States Patent
Krishnamoorthy et al.

(10) Patent No.: US 11,099,967 B2
(45) Date of Patent: *Aug. 24, 2021

(54) MULTI-DIMENSIONAL SELECTIVE TRACING

(71) Applicant: Oracle International Corporation, Redwood Shores, CA (US)

(72) Inventors: Vidyasagar Krishnamoorthy, Fremont, VA (US); Tarun Jaiswal, Dublin, CA (US); Marcelo J. Goncalves, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/528,396

(22) Filed: Jul. 31, 2019

(65) Prior Publication Data

US 2019/0354461 A1 Nov. 21, 2019

Related U.S. Application Data

(63) Continuation of application No. 15/197,468, filed on Jun. 29, 2016, now Pat. No. 10,379,990.

(51) Int. Cl.
*G06F 11/00* (2006.01)
*G06F 11/34* (2006.01)
*G06F 11/30* (2006.01)

(52) U.S. Cl.
CPC ...... *G06F 11/3495* (2013.01); *G06F 11/3034* (2013.01); *G06F 11/34* (2013.01)

(58) Field of Classification Search
CPC .. G06F 11/34; G06F 11/3034; G06F 11/3466; G06F 11/3495
See application file for complete search history.

(56) References Cited

U.S. PATENT DOCUMENTS

| | | | |
|---|---|---|---|
| 7,165,190 B1 * | 1/2007 | Srivastava | G06F 11/0709 714/38.14 |
| 7,565,426 B2 * | 7/2009 | Jones | H04L 43/00 370/229 |
| 7,640,459 B2 | 12/2009 | Ivanov et al. | |
| 7,770,154 B2 | 8/2010 | Lam et al. | |
| 7,827,539 B1 | 11/2010 | Wygodny et al. | |
| 7,954,011 B2 * | 5/2011 | Ivanov | G06F 11/3495 714/45 |

(Continued)

*Primary Examiner* — Elmira Mehrmanesh
(74) *Attorney, Agent, or Firm* — Invoke (57) ABSTRACT

Techniques are described herein for performing multi-dimensional selective tracing within a computer system. In one or more embodiments, the tracing profile indicates what trace data to capture based, at least in part on a set of target types and a set of target dependencies. In response to receiving a request to initiate a tracing session using the tracing profile, a topology of a set of target resources that are deployed is identified. A subset of one or more trace providers is then selected, based at least in part on the topology of the set of target resources that are deployed and the tracing profile. The subset of one or more trace providers generate trace data for a subset of target resources in the set of target resources. If the topology changes, then the set of trace providers that generate trace data may also be updated based on the tracing profile.

20 Claims, 8 Drawing Sheets

(56) References Cited

U.S. PATENT DOCUMENTS

| | | | |
|---|---|---|---|
| 8,756,461 B1* | 6/2014 | Jacob | G06F 11/2097 |
| | | | 714/45 |
| 8,863,091 B2 | 10/2014 | Dageville et al. | |
| 8,924,941 B2 | 12/2014 | Krajec et al. | |
| 9,229,994 B2 | 1/2016 | Moulhaud et al. | |
| 9,529,694 B2 | 12/2016 | Srivastava et al. | |
| 9,537,887 B2 | 1/2017 | Choi et al. | |
| 9,652,361 B2* | 5/2017 | Pickel | G06F 11/366 |
| 9,734,040 B2 | 8/2017 | Gounares | |
| 9,772,927 B2* | 9/2017 | Gounares | G06F 11/079 |
| 9,864,672 B2* | 1/2018 | Seto | G06F 11/3466 |
| 10,379,990 B2* | 8/2019 | Krishnamoorthy | G06F 11/34 |
| 10,776,120 B2* | 9/2020 | Williams | G06F 9/3836 |
| 2005/0276388 A1 | 12/2005 | Ethier et al. | |
| 2008/0098359 A1* | 4/2008 | Ivanov | G06F 11/3495 |
| | | | 717/128 |
| 2008/0155348 A1 | 6/2008 | Ivanov et al. | |
| 2010/0153069 A1 | 6/2010 | Giese et al. | |
| 2011/0067008 A1 | 3/2011 | Srivastava et al. | |
| 2011/0239195 A1 | 9/2011 | Lin et al. | |
| 2012/0324454 A1 | 12/2012 | Gounares et al. | |
| 2013/0103739 A1 | 4/2013 | Salgueiro et al. | |
| 2013/0111011 A1 | 5/2013 | Moulhaud et al. | |
| 2013/0166577 A1 | 6/2013 | Barak et al. | |
| 2013/0232433 A1 | 9/2013 | Krajec et al. | |
| 2013/0232452 A1 | 9/2013 | Krajec et al. | |
| 2013/0283242 A1 | 10/2013 | Gounares | |
| 2014/0317605 A1 | 10/2014 | Gataullin et al. | |
| 2016/0020941 A1 | 1/2016 | Asati et al. | |
| 2016/0283345 A1 | 9/2016 | Gounares et al. | |
| 2017/0134258 A1* | 5/2017 | Kumar | H04L 41/12 |
| 2017/0255545 A1 | 9/2017 | Voccio et al. | |
| 2018/0004623 A1 | 1/2018 | Krishnamoorthy et al. | |

* cited by examiner

MULTI-DIMENSIONAL SELECTIVE TRACING

INCORPORATION BY REFERENCE; DISCLAIMER

The following application is hereby incorporated by reference: application Ser. No. 15/197,468 filed on Jun. 29, 2016, now U.S. Pat. No. 10,379,990. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to logging by computer systems. In particular, the present disclosure relates to computer-implemented techniques for selectively tracing along multiple dimensions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Tracing is a form of computer logging through which information about a software application's execution is recorded. The messages recorded in a trace log typically capture low-level information that may be used by software developers, system administrators, and other personnel to troubleshoot problems that occur at runtime. For example, a trace logging message written to a trace log may indicate a state of the software program's execution at the time of the call or other runtime information that may be useful for debugging problems that may arise during the software application's execution.

To enable trace logging by a software application, the source code of the application may be instrumented with trace logging calls to a trace logging module. When the code or a compiled version thereof is executed by a computer system, the trace logging calls cause trace logging messages to be written to a trace log, where they may be subsequently accessed and analyzed. Typically, the trace logging calls capture execution information at a fine level of detail to help diagnose and isolate the root cause of a problem. For example, trace logs may pass information about variables, fields, values, or states ("information") of the software as they existed at the time of the call, and in an execution context that was available to/exposed to/within the execution scope of the call. Different calls may expose different such information based on the different execution contexts or scopes in which the different calls were executed. The information may also vary over time depending on the functionality for which the code is operating or subject data on which the code is operating at a given time. Capturing trace messages at the finest possible level of detail typically results in huge amounts of trace data being generated, which may increase the storage footprint of the trace log and degrade performance of the software application and the host machine(s) on which the software application is executing.

In order to mitigate the impact of performance degradation caused by trace logging operations, one approach is to implement an adaptive trace logging module that automatically changes the trace logging level of the executing software application based on detected runtime conditions. In a normal operating state, a trace logging module may capture information at a higher level of detail to reduce the overhead of trace logging operations. If an abnormal condition is detected, then the adaptive trace logging module may increase the trace logging level to capture information at a finer level of detail and help diagnose any issues that caused the abnormal condition. An example of an adaptive trace logging module is described in U.S. patent application Ser. No. 12/559,338, entitled "Techniques for Adaptive Trace Logging", the entire contents of which are incorporated by reference herein as if set forth in their entirety.

Adaptive trace logging modules increase the level of trace messages in scenarios where it may be acceptable from a system performance standpoint to generate additional finer trace level data. However, much of the finer-level details that are captured may be irrelevant to the problem at hand. As a result, though some of the finer-level details may be helpful in isolating and resolving the problem, technical personnel may still need to sift through vast amounts of trace data in an effort to identify the data that is relevant. This may cause delay in resolving defects or other issues in a software application, the negative impact of which becomes particularly acute within production and mission-critical systems.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TOPOLOGY-AWARE TRACING SYSTEM
3. TRACING PROFILES
4. TRACING SESSIONS
5. TOPOLOGY AND TRACING PROFILE UPDATES
6. HARDWARE OVERVIEW
7. MISCELLANEOUS; EXTENSIONS

1. General Overview

Traditionally, the responsibility of addressing degraded performance or other problems within software systems has fallen on system administrators or other technical personnel. When a problem is encountered, the system administrator, based on a working knowledge of the system, identifies which software or hardware components are the likely cause of the problem. As part of the analysis, the administrator may examine different trace data associated with various components in order to narrow down and isolate the likely cause of the problem.

In complex software applications, there are many different potential components that may generate trace data. For instance, a multi-tier application may have one or more components deployed at each tier, each of which may potentially generate its own trace data. The application may also be deployed across a clusters of nodes in a distributed computing environment, with each node corresponding to a physical or virtual host machine running and generating trace data for one or more software components. Given the number of components that may generate trace data within a given system, the amount of trace data to analyze may be overwhelming should performance degradation or some other problem arise.

One approach to limit the amount of trace data that is generated is to allow the user to individually select the components that generate trace data. While this approach reduces how many components in the system are generating trace data, it relies on the user's knowledge of the underlying components of the system to make the selections. In many cases, the user may not have a complete knowledge of what should be traced, especially in systems where components are frequently changing. Even in scenarios where the user has such knowledge, an individual component selection may still generate a relatively large amount of irrelevant trace data. For example, a trace provider may generate trace data for a plurality of different client requests even though a problem with the application may be isolated to a single client or some subset of clients.

Techniques are described herein for selectively generating trace data based on options defined across a set of dimensions. The dimensions may be defined in such a manner to reduce the amount of irrelevant trace data that is generated by components of a complex software application. Trace data is considered "irrelevant" in this context if it does not help address performance degradation or some other problem within a computing system. By reducing the amount of trace data that is generated, the overhead of performing tracing operations and storing trace data may be improved. Further, the trace data that is generated has a higher likelihood of being relevant thereby facilitating isolation and resolution of potential problems within the system.

In one or more embodiments, the topology of a complex software application is taken into account when determining what trace data to generate. By monitoring the topology of a system, the different types of target components and dependencies between the components that are deployed within a computing environment may be determined and factored into the selection of which trace data to generate. The topology monitoring may help identify and isolate the components that are likely to generate trace data that is of interest. It may further be leveraged to keep track of any changes in the underlying components within the complex software application.

In one or more embodiments, a set of one or more tracing profiles are defined and stored, in non-volatile and/or non-volatile storage. A tracing profile in this context refers to a file or other data object that captures a set of parameters that control what trace data is generated during a tracing session. The parameters specified in the tracing profile may vary depending on the particular implementation as shall be described further herein.

In one or more embodiments, the tracing profile indicates what trace data to capture based, at least in part on a set of target types and a set of target dependencies. In response to receiving a request to initiate a tracing session using the tracing profile, a topology of a set of target resources that are deployed is determined. A subset of one or more trace providers may then be selected, based at least in part on the topology of the set of target resources that are deployed and the tracing profile such that the selected subset of trace providers generate trace data for a subset of target resources in the set of target resources.

2. Topology-Aware Tracing System

Execution of a complex application typically involves the coordination and use for many different hardware and software resources. For instance, hardware resources, such as processing cores, memory, network ports, database storage space, etc., are often allocated during application runtime. Various software resources may also be allocated such as operating system (OS) resources, Java Virtual Machines (JVMs) and/or other virtual machine resources, database instances, and/or other software services. A hardware and/or software resource that is involved in execution of a software application is hereby referred to as a "target component" or "target resource".

Trace providers may be deployed alongside target components to provide runtime information about the application. A trace provider in this context refers to an application, application module, operating system component, or other computer-implemented logic that generates trace data for one or more target components. Example trace providers may include, without limitation, diagnostic loggers that generate trace messages and log execution information, metric tracking services that track and collect metric values measuring resource usage, and event loggers that track and record specific events, or some combination thereof. Data that is generated by a trace provider is herein referred to as "trace data", which may include, without limitation, trace messages, metric values, event logs, or any other data that measures or otherwise indicates a state of a target resource during execution of the application.

In one or more embodiments, a trace provider (herein referred to as a "parent" trace provider) may manager a plurality of other trace providers (herein referred to as a "child" trace provider or a "tracing object"). For instance, a logging trace provider may manage a plurality of individual logger tracing providers/tracing objects. As another example, a metric trace provider may manage a plurality of metric sensors that each collect different metric values. In yet another example, an event logger trace provider may manage a plurality of individual event loggers that track different events. As shall be explained further, this architecture may facilitate the processing of provider-specific parameters to control both individual trace objects and parent trace providers.

In one or more embodiments, a tracing system accounts for the topology of an application when determining whether to selectively enable and/or disable a set of trace providers. A "topology" in this context refers to the overall architecture, arrangements, types of resources, dependencies and/or usage of resources during runtime. As shall be described further herein, an understanding of a system's topology may be leveraged to generate trace data for target resources of interest and to disable trace messages for target components that are not likely relevant to a problem, thereby reducing the processing and storage overhead consumed by tracing operations.

In one or more embodiments, topology metadata includes information that describes the types of target components deployed and involved in the execution of an application. Example target types may include, without limitation, cloud services, aggregate services, and other types of software services, clusters, groups, hosts, Java Virtual Machines (JVMs), JVM pools, applications, servers, database instances, OS services, central processing units (CPUs), network ports, memory pools, and any other classification of a software or hardware resource. Limiting the components that generate trace data by target type may be helpful in instances where it is known or highly likely that a problem is caused or otherwise associated with a particular target type or set of target types.

In one or more embodiment, the topology metadata includes information describing dependencies and/or other relationships between targets. For instance, a topology graph may show that one node (corresponding to a target resource) is connected to another node (corresponding to a different target resource), indicating that the two nodes/corresponding target resources have a relationship with each other. If one target resource is "connected to" another target resource in a topology graph, then the two resources are determined to be functionally associated with each other. In various embodiments, the relationships may indicate more than just a connection between two nodes such as a functionality and/or a direction associated with that connection. For example, a functionality is present in a relationship of "A runs on B" or "A is stored on B" or "A uses B as a load balancer." A direction may be present in a relationship of "A uses B" or "B uses A," or even "B uses A and A uses B." The topology graph may be traversed to determine which resources are functionally dependent on other resources and/or other relationship information. In the context of an application server, for example, a topology graph may have a node corresponding to the application server connected to several applications, indicating that the server is "connected" to each of the applications. The topology graph may further indicate that each of the applications are functionally dependent on the application server. If a target resource is suffering from performance degradation and is functionally dependent on another target resource, then it may be useful to enable tracing on both to track both resources. On the other hand, if target resources are unrelated, then it may not be useful to have tracing enabled for both (depending on the particular implementation). In other cases, it may be redundant to enable trace data for two target resources that are closely correlated. For instance, it may not be useful to report both CPU usage and input/output bottlenecks if the CPU usage always increases with I/O bottlenecks. Thus, the target types and relationships captured in the topology metadata may be leveraged to hone in on which components are likely to generate trace data that is relevant.

Complex software applications often include a plurality of tiers or layers. Each "tier" or "layer" of a multi-tier application represents a distinct logical and/or physical element that is responsible for a different set of functions. The number and configuration of tiers within a multi-tier architecture may vary, depending on the particular implementation. For instance, a three-tier system may comprise a presentation tier comprising logic for displaying and/or receiving information, an application tier comprising logic for implementing application-specific functions, and a data tier comprising logic for storing and retrieving data. In other examples, the multi-tier architecture may include, in addition or alternatively to the tiers previously listed, a web tier comprising logic for processing web requests and/or a middleware tier comprising logic to connect other tiers within the architecture, and/or any other tier comprising one or more software and/or one or more hardware components. The topology metadata may describe the relationship between target resources in the same tier and in different tiers, including the types of target deployed at each tier. In some cases, trace data for one or more tiers may be of more interest to a user than trace data from other tiers. For instance, a database administrator may be more interested in generating trace data for the data tier than from other tiers in the system. On other hand, an application administrator may be interested in both the application tier and the database tier since the application tier may have more dependencies on the database tier than vice versa.

In a clustered environment, topology metadata may capture which software components are deployed across a plurality of physical and/or virtual hosts. For example, the topology metadata may indicate that a first instance of an application is executing on a first server/host, a second instance of the application is executing on a second server/host, etc. In the present example, the first instance of the application is functionally dependent on the server and host on which it executed, but not on servers and hosts in other nodes in the cluster. However, if one of the nodes in another cluster becomes non-operational, it may result in increased traffic on the first node. Therefore, trace data across different nodes may be of interest to capture a complete picture of performance degradation in some instances.

Figure 1:
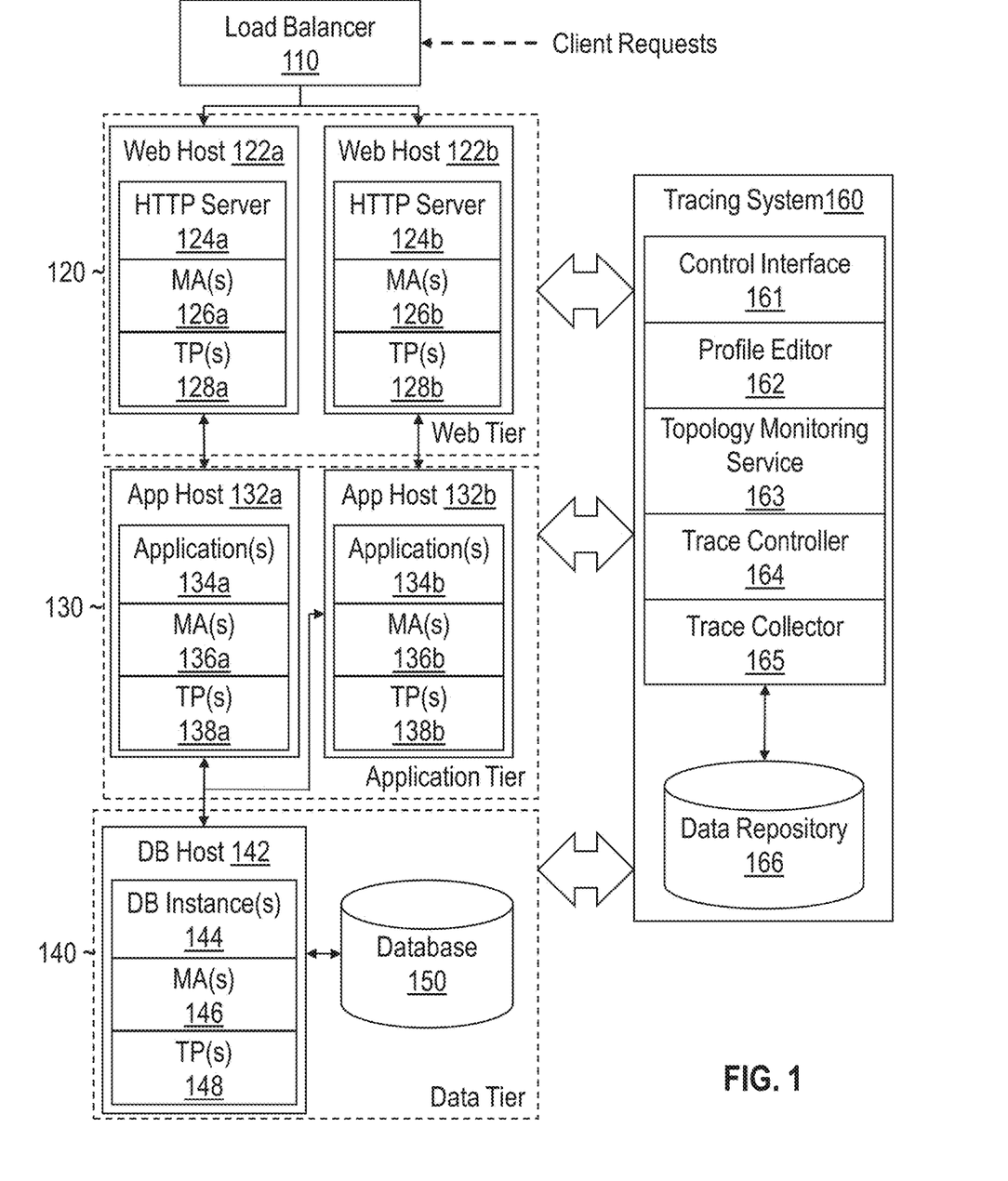
FIG. 1 illustrates a topology-aware tracing system in accordance with one or more embodiments.

Referring to FIG. 1, it illustrates topology-aware tracing system 160, which includes control interface 161, profile editor 162, topology monitoring service 163, trace controller 164, trace collector 165, and data repository 166. Each of the components of tracing system 160 represents logic that provides a set of functions through which tracing operations may be managed and executed. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Tracing system 160 controls the trace data that is generated within a multi-tier application including the components deployed in web tier 120, application tier 130, and data tier 140. With reference to the multi-tier application, client requests are received at load balancer 110. In response, load balancer 110 routes the request to one of web host 122a or web host 122b, which execute Hypertext Transfer Protocol (HTTP) server 124a and HTTP server 124b, respectively. Application (App) hosts 132a and 132b execute application(s) 134a and application(s) 134(b) to provide application-specific functionality in order to process the requests. Database (DB) host 142 executes DB instance(s) 144 which managee storage and retrieval of information from database 150 in response to the client requests. Although a particular topology of the multi-tier application is depicted, the actual topology of the application monitored by tracing system 160 may vary from implementation to implementation. The application may include additional or fewer tiers and target resources. Further, the topology of the multi-tier application may change over time with the addition, removal, and/or update of target resources.

In order to monitor the topology of the multi-tier application, a set of monitoring agents are deployed on each host. These monitoring agents (MAs) may include, without limitation MA(s) 126a, 126b, 136a, 136b, and 146. A monitoring agent may be a background process, such as a daemon, that executes on the corresponding host machine and generates information about the targets that are installed on the machine. For instance, the monitoring agents may generate information that identifies the target type, connections, and/or other relationships associated with a target component. Topology monitoring service 163 collects the topology metadata and stores it in data repository 168, which represents volatile and/or non-volatile storage.

A set of one or more trace providers (TPs) are also deployed on each host, including TP(s) 128a, 128b, 138a, 138b, and 148. Each trace provider may be selectively enabled or disabled by trace controller 164. If enabled, the respective trace provider generates trace data which is collected by trace collector 165 and stored in data repository 168. The trace providers may also be configured to generate trace messages in accordance with a set of options defined in a tracing profile. Example tracing profiles and options are discussed in further detail in the sections below.

Control interface 161 represents one or more interfaces through which a user may interact with tracing system 160. A "user" in this context may comprise a human user such as a system administrator or a separate application. Example interfaces that may be provided through control console 114 may include, without limitation, a graphical user interface (GUI), an application programming interface (API), a command-line interface (CLI) or some other interface that allows users to invoke one or more services provided by tracing system 160. For example, a user may interact with profile editor 162 to generate tracing profiles and trace controller 164 to initiate tracing sessions.

3. Tracing Profiles

As previously indicated, a "tracing profile" refers to a file or other data object that defines a set of dimensional attributes (also referred to herein as "options") that control what trace data is generated during a tracing session. The dimensional attributes that are defined may span a plurality of dimensions to provide flexibility in the trace data that is generated and to prevent trace operations that produce irrelevant trace data from being performed.

In one or more embodiments, the tracing profile specifies one or more user-based dimensional attributes that control the generation of trace data based on which user of a plurality of users originated a request that may be traced. User-based dimensions may be useful in scenarios where a problem within an application can be isolated to a particular user or a particular set of users. In this example, a user-based dimension may specify a user identifier or set of user identifiers as a dimension value. In response, trace data may be limited to the user or set of user(s) defined in the tracing profile. Trace data is not generated for client requests that originate from users not defined in the tracing profile.

In one or more embodiment, the tracing profile specifies one or more role-based dimensions that control the generation of trace data based on the role of the user initiating a tracing session. This option may be useful in scenarios where certain trace data is more relevant to technical personnel having one role than technical personnel having another role. For instance, it may be determined that certain trace data is more relevant to database administrators than middleware administrators. In this example, the tracing profile may selectively enable components based on the role of the user initiating a tracing session. If it is determined that the role of a user initiating the tracing session is database administrator, then the set of components selected to generate trace data may be different than if a middleware administrator or a user with some other role had initiated the tracing session. Thus, different roles may map to different respective sets of tracing options.

In one or more embodiments, the tracing profile specifies one or more application-based dimensions that control the generation of trace data based on what application is associated with a request. As an example, if the request is to be processed by a first type of application, a different set of trace providers may be enabled than if the request is to be processed by a second type of application. In the context of an Internet retail application, for instance, a first set of trace providers may be enabled if the shopping cart application is being accessed by the request, and a second set of trace providers may be enabled if a different application (e.g., checkout application) is being accessed by the request.

In one or more embodiments, the tracing profile specifies one or more provider-based dimensions that control the generation of trace data based on the trace providers that are deployed within the system. The trace providers that are selected may depend on which trace providers are more likely to generate relevant trace data. For instance, one logger may be more likely to capture relevant data based on the content of the trace data it produces and/or the location within the system architecture that is deployed than another logger. Any combination of loggers and other trace providers may be enabled/disabled as specified in the tracing profile. In other words, the tracing profile may define which trace providers to selectively enable and/or disable for a given tracing session. In addition or alternatively, provider-specific dimensions may be specified by the tracing profile. Provider-specific dimensions are options that specific to one or more trace providers and not applicable/supported globally across all trace-providers. One or more of the dimensions described herein, including, without limitation, content-based dimensions, trace-level dimensions, and/or other dimensions specified by a profile may be a provider-specific option. In other words, a tracing option specified within a tracing profile may be defined with reference to/applied to a single trace provider, a group of trace providers, or globally across all trace providers.

In one or more embodiments, the tracing profiles specifies one or more content-based dimensions that control the generation of trace data based on content. In some scenarios, certain types of content may be irrelevant or of little interest to a user while other types of content may be more relevant. Trace providers may be configured to generate trace data for certain attribute values of a request and to disable trace data for other attributes. As an example, the tracing profile may select, from a list of metrics that may be traced, a subset of metrics (e.g. CPU usage, number of active database sessions, etc.) that are of interest. As another example, a tracing profile may select which events to track or what types of trace messages to generate. Trace data that does not satisfy the content-based dimensional criteria is not captured by tracing system 160.

In one or more embodiments, the tracing profile specifies one or more topology-based dimensions that control the generation of trace data based on the underlying topology of a system. The topology-based attributes may be specified as a function of target types, relationships, and/or other architectural characteristics (herein referred to as "artifacts"). For instance, the tracing profile may explicitly include and/or exclude trace data that originates from a certain target type. As another example, the tracing profile may explicitly include and/or exclude trace data from target resources based on the relationship of those target resources with another deployed target resource. For instance, trace data may be captured based on whether a target is functionally dependent on another target, part of the same cluster as another target, etc.

In one or more embodiments, the tracing profile defines a trace logging level that controls how many trace messages a selected component or group of components generates. In some scenarios, it may be useful to trace one component at a lower-level than another component to capture more detailed information about the component that is of greater interest. Based on the specified logging level, tracing system 160 may generate trace messages in accordance with a trace logging severity parameter that indicates one severity in a range of tracing severity to associated with the message. An example range of tracing severity from most severe to least severe is: "Error", "Warning", "Notice", "Info", "Debug", and "Trace". By specifying a trace-logging level, the trace messages that are captured may be limited to trace messages indicating a particular level of severity. The highest level of trace logging may capture trace messages across the range of tracing severity while the lowest level of trace logging may limit the trace messages to those that are most severe. Trace logging levels in between the ranges may capture messages within some subset of the range.

In one or more embodiments, a dimensional value may be specified as a function of other dimensional values. For example, the trace logging level may be defined as a function of target types and dependencies. Continuing with the present example, the user may specify that trace data should be generated at a first trace level for target of a specific type that are functionally dependent on a particular target component, a second level for targets of a different type that are functionally dependent on the particular target component, and a third level for targets that are not functionally dependent on the particular target component. As another example, the trace logging level may be defined as a function of which logger is generating the trace data, where a first set of loggers generates trace data at a first level and a second set of loggers generates trace data at a second level. Any other combination of dimensional attributes may be used to control the execution of trace operations and generation of trace data for a complex software application.

Figure 2:
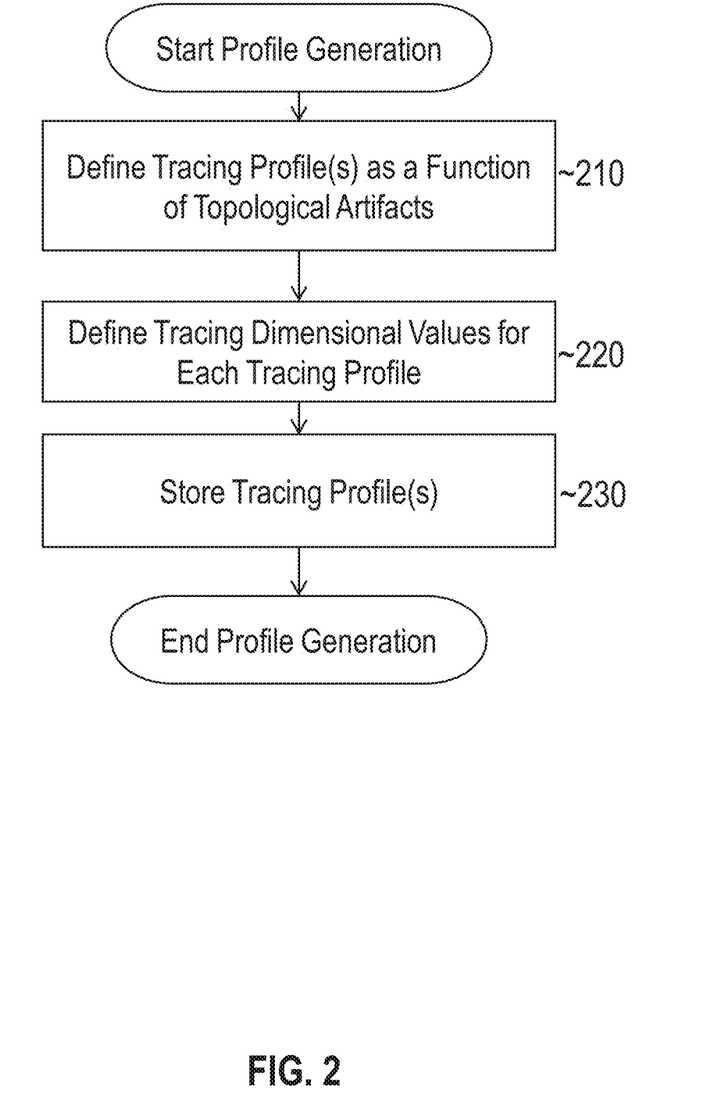
FIG. 2 illustrates an example set of operations for generating a tracing profile in accordance with one or more embodiments.

With reference to FIG. 2, it depicts an example set of operations for generating a tracing profile in accordance with one or more embodiments. At 210, profile editor 162 defines a set of one or more tracing profiles as a function of topological artifacts, such as target types and target relationships. By defining profiles as a function of topological artifacts, different tracing profiles may represent different topology-based buckets that map to or otherwise refer to different components within the topology based on target type and target relationships. As an example one or more of the following tracing profiles may be defined:

Infrastructure: An "infrastructure" tracing profile may map to a set of infrastructure components (e.g., hosts, storage, network, etc.).

Database: A "database" tracing profile may map to components in a database tier (e.g., database instances, database clusters, listeners, automatic storage management (ASM), etc.)

Middleware: A "middleware" tracing profile may map to components in a middleware tier (e.g., middleware servers, middleware clusters, middleware domains, middleware instances, etc.)

Application: An "application" tracing profile may map to components in an application (e.g., application servers, application instances, etc.)

In addition or as an alternative to any of the above buckets, any other buckets may be defined as a function of target types, target relationships, and/or other topological-based criteria. With profiles defined as a function of topological artifacts, the currently deployed target components of an application may be matched against a profile based on topology. The components that match the profile's topological definitions may be included in a tracing session if other dimensional attributes, if any, that have been defined are also satisfied.

At 220, profile editor 162 defines a set of dimensional values for each tracing profile. As previously indicated, there are many possible dimensions for which values may be specified. For instance, a first dimension may allow a user of tracing system 160 to specify a particular client (or user) of the multi-tier application or set of clients (or users) for which trace data should be generated, a second dimension may allow a user to select from a list or otherwise define specific metrics that should be tracked, and a third dimension may allow a user to select a logger from a list of loggers that should generate trace data. Using this approach, users can selectively start tracing on a subset of components that intersect across these dimensions thereby limiting the amount of trace data that is generated and mitigating the impact of tracing operations on the performance of the application. The multi-dimensional aspect of the selective tracing is also useful in scenarios where the nature of these components that are used for tracing are different. The components along one dimension might be relatively static (e.g. loggers may be relatively slow to change) whereas the components along another dimension may be faster-changing (e.g. the users and application components within a multi-tier application may be frequently updated).

Based on the foregoing, a variety of different tracing profiles may be defined with any number and combination of dimensions. Once defined, at 230, the profile editor 162 stores the set of one or more tracing profiles in data repository 166. The tracing profiles that are stored in data repository 166 may be accessed by trace controller 164 to execute tracing sessions in accordance with the dimensional values, as described further below.

4. Tracing Sessions

In one or more embodiments, one or more tracing sessions is initiated using a tracing profile. A "tracing session" in this context refers to a period during which a set of tracing operations are performed to generate trace data during application runtime. The tracing operations are performed such that trace data is captured on the intersection of dimensions that are defined within the tracing profile. In one or more embodiments, trace data that does not satisfy one or more of the dimensional criteria is not generated, stored or otherwise captured. This reduces the impact of tracing operations on runtime system performance by limiting the trace data that is generated within the system. Further, it helps minimize the amount of filtering of irrelevant trace data to isolate issues within the system.

Figure 3:
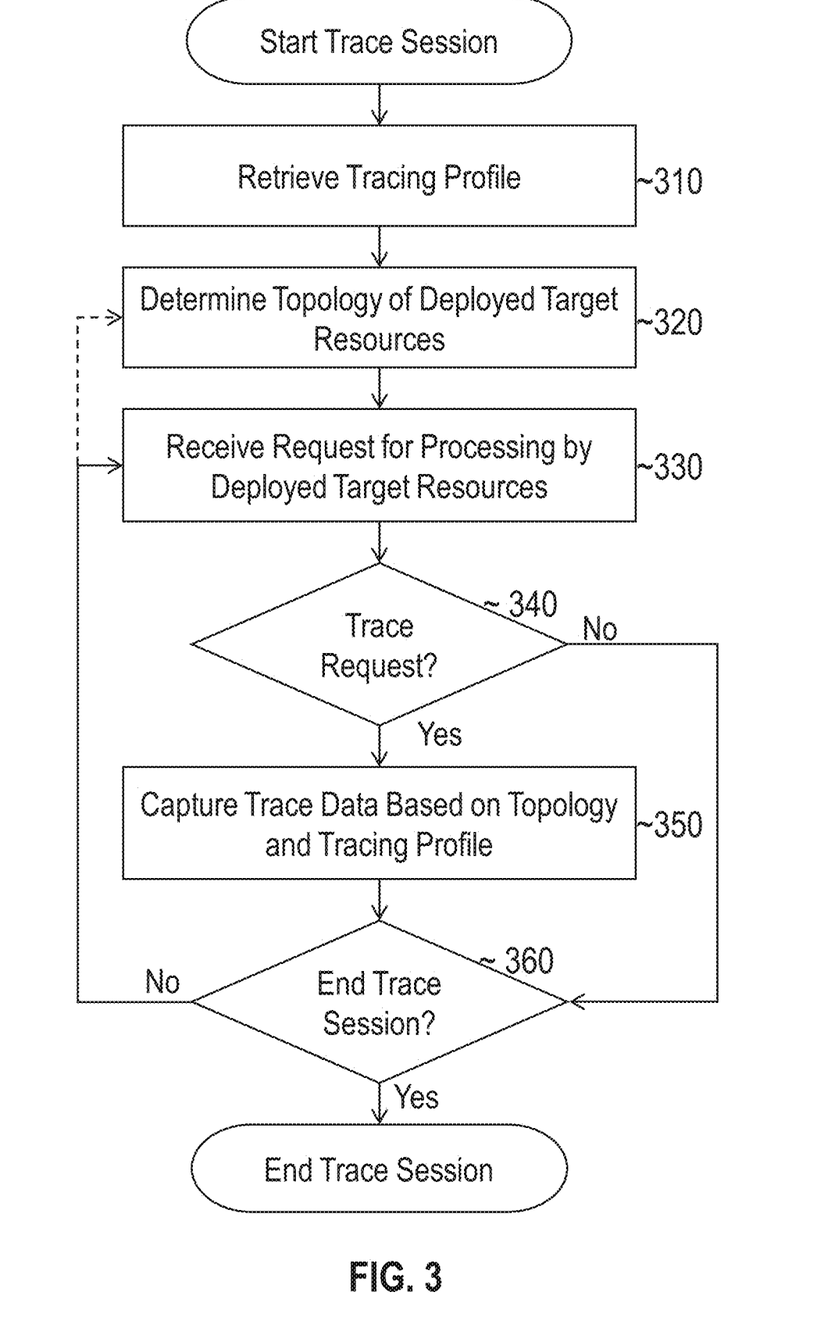
FIG. 3 illustrates an example set of operations for obtaining trace data during a trace session in accordance with one or more embodiments.

With reference to FIG. 3, it depicts an example set of operations for generating a tracing profile in accordance with one or more embodiments. In response to a request to initiate a tracing session using a specified tracing profile, trace controller 164 retrieves, at 310, the specified tracing profile from repository 166. In one or more embodiments, the request specifies values for one or more of the dimensional attributes or other tracing options previously described. Based on the request a tracing profile may be generated or a previously defined tracing profile may be updated to include the selected tracing options before the tracing session is executed. In addition or alternatively, one or more dimensional attribute values may be determined, in whole or in part, from a pre-defined tracing profile which is referenced by the request.

At 320, trace controller 164 determines the topology of deployed target resources and matches the components of the topology against the target types, dependencies, and/or other topological artifacts defined by the tracing profile. For example, trace controller 164 may traverse a topology graph and/or analyze some other set of topology metadata that was collected by topology monitoring service 163 to determine the connections between targets and the types of target resources that are currently deployed within each tier of the multi-tier application. In one or more embodiments, trace controller 164 matches components within the determined topology against the topological criteria/artifacts defined in the tracing profile. Components that do not satisfy the topological criteria (e.g., the target type, dependency, relationship, etc. does not match the specified criteria) are not included in the tracing session. On the other hand, components that satisfy the topological criteria may be included in the tracing session if the other dimensional criteria, if any, are satisfied.

At 330, the multi-tier application receives a request to be processed by the deployed target resources. In one or more embodiments, a hook is deployed into the request processing mechanism in the system in order to trigger tracing services for the received request. The hook may be built into load balancer 110, within web hosts 122a and 122b or at some other high-level "entry" point that processes incoming requests. When a new request enters the system, a callback is generated to invoke selective trace controller 164. In response, trace controller 164 controls the tracing operations that are performed within the system as described in further detail below.

Once trace controller 164 receives a new request, it determines, at 340, whether to trace the request. In order to determine whether to trace the request, trace controller 164 may process the dimensional attributes in the tracing profile to determine the user-based conditions, application-based conditions, and/or other conditions defined as a function of the requests that are received. Trace controller 164 may then analyze the request to determine whether the conditions are satisfied. For example, trace controller 164 may determine that the request should not be traced if it originates from a particular client/user, if the request is associated with a particular application, and/or if the request does not satisfy some other dimensional attribute defined by the tracing profile. In one or more other embodiments this step may be skipped if it is determined that all requests received by the application should be traced. If tracing is not enabled then controller 164 may return from the callback and the request processing continues with no tracing being performed.

If tracing is enabled for the request, then at 350, trace controller 164 captures trace data based on the underlying topology of the system and/or the other dimensions specified in the tracing profile. In one or more embodiments, trace controller 164 determines which of the tracing providers to enable based on the specified dimensions. Trace controller 164 may verify whether the currently enabled trace providers supports tracing for the current request attributes. Then, for each provider that can trace the request, trace controller may issue a "startTracing" call to the trace provider to signal that it should trace the current request. The call may also include provider-specific parameters if there are any provider-specific dimensions specified in the tracing profile. Example provider-specific parameters may include, without limitation, a trace-logging level, metric selections and other content-specific restrictions on which trace data to generate, logger selection, and any other provider-specific data that controls the generation of trace data by the tracing profile that received the call such that data is generated in accordance with the dimensions specified in the tracing profile.

For provider-specific dimensions, selective tracing is controlled by the trace provider itself, either using parameters that are passed to the trace provider during the startTracing call or using a global state. As an example, a logging provider may support tracing by multiple loggers and each logger may be enabled or disabled for the current trace. Therefore logging calls can be traced for a particular request and for a subset of available loggers. A metric sensor provider can also be traced for a specific subset of sensors. For instance, a metric sensor may compute aggregate metrics for all request, but when tracing is enabled it instead may trace individual activations. As another example, an event duration sensor may be used to compute aggregate duration of some particular event over all requests or may report the duration of the event for a particular traced request. Other types of trace providers can trace other specialized events, metrics, or other details. This allows a finer granularity of control over the trace data that is generated by each trace provider that is enabled.

In one or more embodiments, individual trace objects, such as individual loggers or metric sensors, may determine if tracing is enabled using a single flag associated with the request state. This allows the individual objects to be controlled without having to determine the value of multiple request attributes. Rather, they may determine whether to generate trace data based on a simple and fast check to the flag. In addition or alternatively, one or more individual tracing objects may not use a single flag mechanism to determine whether or not to generate trace data. Trace providers may use different mechanisms to signal to the trace objects that they manage, and the parameters that are passed to the individual trace objects may vary from implementation to implementation.

If the controller determines that the request needs to be traced then the controller will start looking at the other dimensions. First it will check the tracing providers. Each tracing provider may support tracing for the current request attributes. The controller verifies each of the currently enabled providers if the provider supports tracing for the current request attributes. Then, for each provider that can trace the request, the controller will make a "startTracing"

call to the provider to signal that it must trace the current request. The call may also include provider specific parameters.

Once a request is flagged for tracing, the request will be traced in accordance with the tracing profile. Thus, the trace providers generate trace data in accordance with the parameters that were passed in the "startTracing" call. When tracing is disabled, trace controller 164 issues a "stopTracing" call to each enabled trace provider. Depending on the type of trace provider, the this call may cause the trace provider to write trace data out (if the provider buffers trace data in memory), or write tracing data to an "incident". Trace collector 165 gathers the trace data from the various trace providers that are enabled and generating trace data within the system and stores the trace data in data repository 166.

At 360, trace controller 164 determines whether to end the tracing session. A tracing session may be run for a specified duration or may be performed indefinitely until an explicit request to stop tracing is received. If it is determined that the tracing session should continue, then tracing operations continue. In some embodiments, the process may return to 320 to check for updates to the topology. This allows the tracing system 160 to react in scenarios where target components are added, removed, or otherwise modified within the multi-tier application.

The log messages and other trace data that is generated by a trace data may be scanned, sorted, and otherwise processed by dimension. For instance, a user may search for log messages generated by a particular logger or set of loggers. In another example, a user may search for log messages generated for target resources having a particular target type or dependencies. Scanning log messages generated by a tracing session and finding finer level trace messages from selective components from multiple dimensions (e.g. finer level trace messages from a given application only for a few loggers) can help identify if these messages are generated by a multi-dimensional tracing session.

Figure 4A:
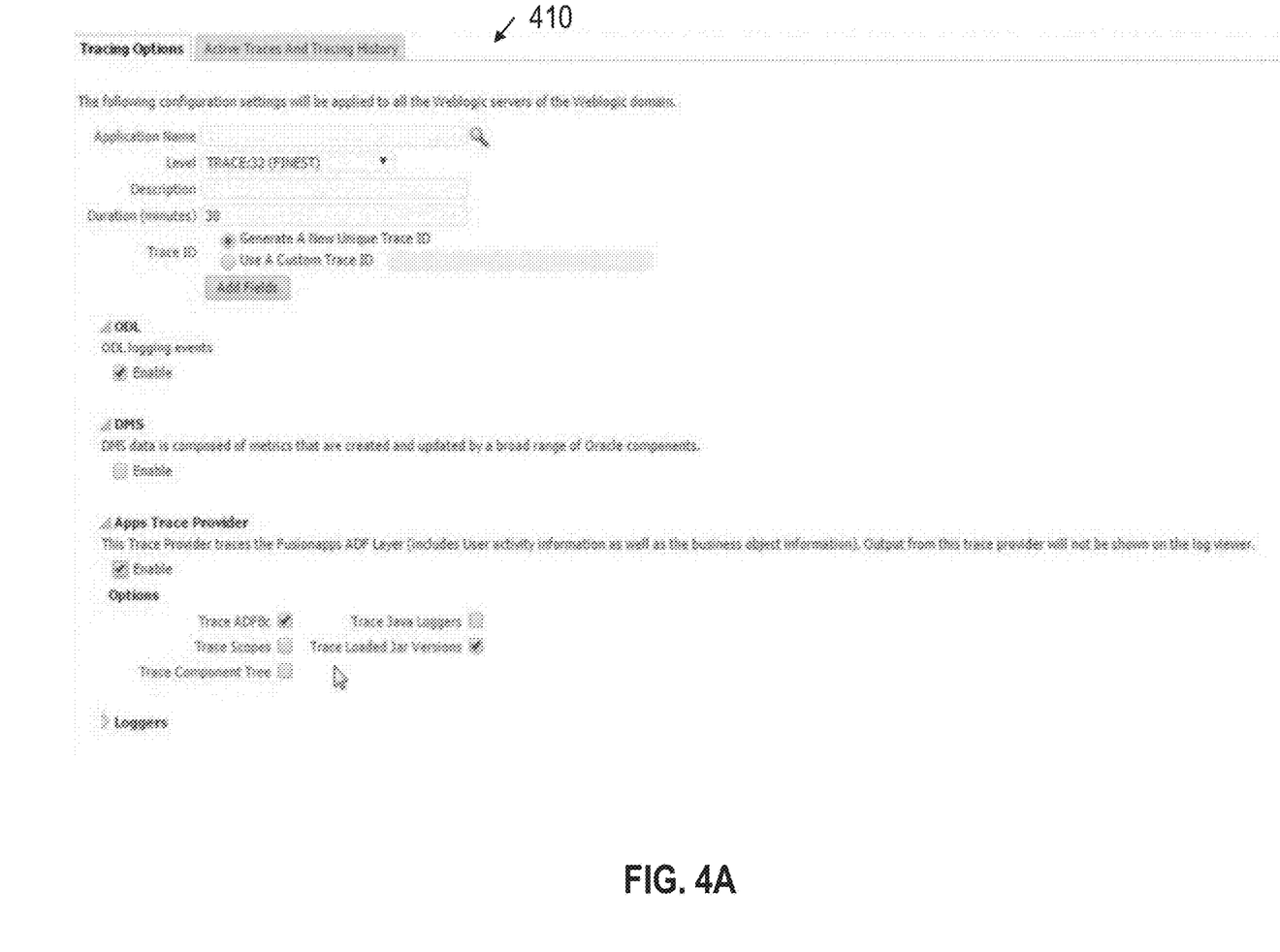
FIG. 4A illustrates an example interface for starting a tracing session using a tracing profile in accordance with one or more embodiments.

With reference to FIGS. 4A, 4B, 4C, and 4D these figures illustrate example graphical user interfaces through which tracing sessions may be performed in accordance with a tracing profiled in accordance with one or more embodiments. Referring to FIG. 4A, interface 410 includes a set of fields for defining tracing profile options. These fields allow a user to select an application-based dimension by specifying the application for which trace data should be generated, a level-based dimension indicating the level of detail for which trace data should be provided, and provider based dimensions allowing the user to select specific providers from a list of trace providers. The fields further allow the user to specify a duration for the tracing session, a trace identifier for the tracing session, and a description for the tracing session. In one or more embodiments, a set of default options may be selected within the interface based on the role of the user initiating the tracing session. In addition or alternatively, a set of default tracing options may be presented and selected based on the underlying topology of the system and/or other system attributes associated with the tracing profile.

Figure 4B:
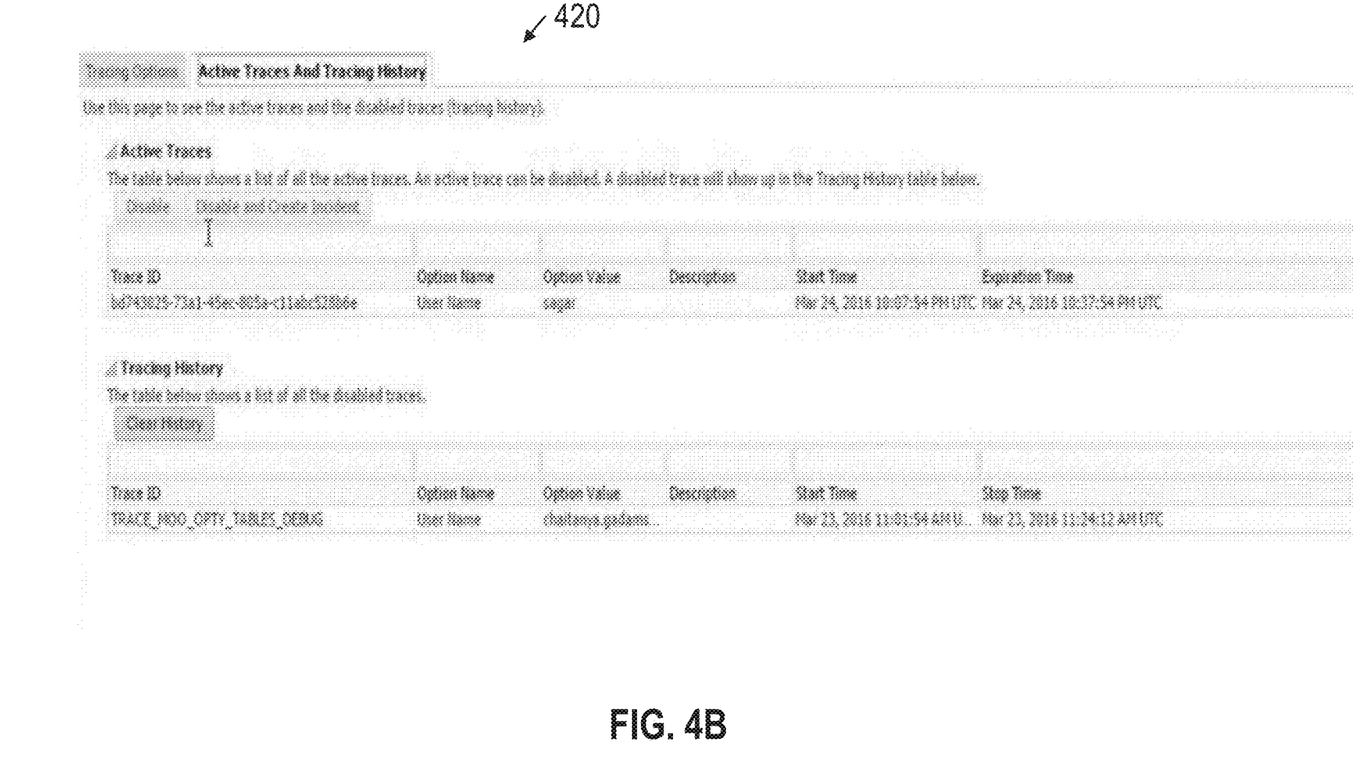
FIG. 4B illustrates an example interface for monitoring active traces and tracking history in accordance with one or more embodiments.

With reference to FIG. 4B, it illustrates example interface 420 for monitoring active traces and tracking history in accordance with one or more embodiments. Once the tracing session is initiated, the "Active Traces and Tracking History" tab may be selected to view and search the trace data that has been captured by the tracing system. The "Active Traces" section lists the tracing sessions that are currently active, if any. The "Tracking History" section depicts tracing sessions that are no longer active but for which the trace data may still be viewed. Each section organizes tracing session using the trace identifier assigned to the respective sessions and displays various session attributes. A user may drill down on individual tracing sessions by clicking or otherwise selecting the trace identifier assigned to the session.

Figure 4C:
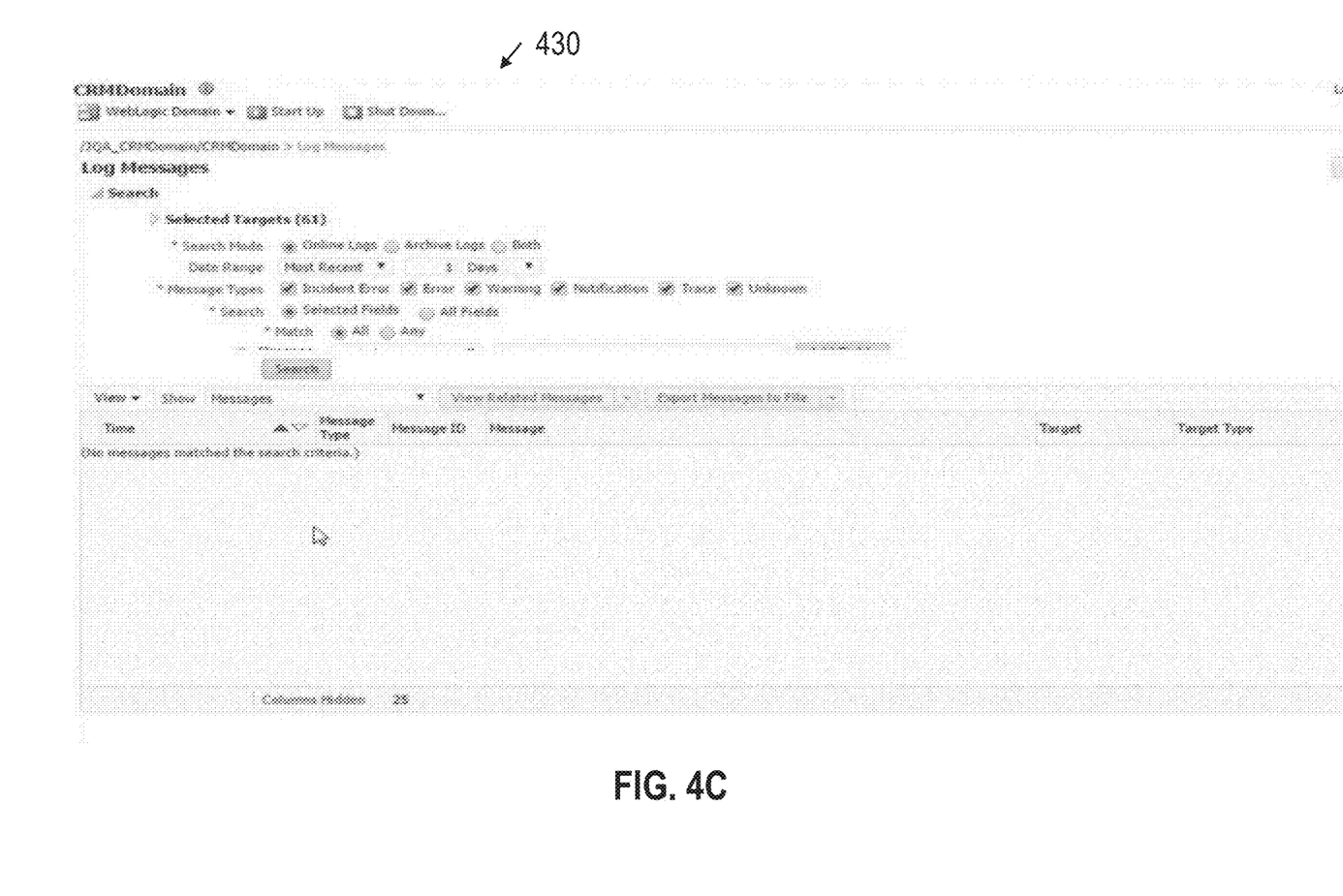
FIG. 4C illustrates an example interface for viewing trace data in accordance with one or more embodiments.

FIG. 4C illustrates an example interface 430 for viewing trace data in accordance with one or more embodiments. Interface 430 provides various graphical user interface objects through which a user may search for trace messages based on a set of specified criteria. The user may filter the messages along various dimensions to search for and isolate messages that are of interest. Messages that satisfy the criteria are displayed along with various message attributes such as the time the message was generated, the type of message that was generated, the target that generated the message, and the target type that generated the message.

Figure 4D:
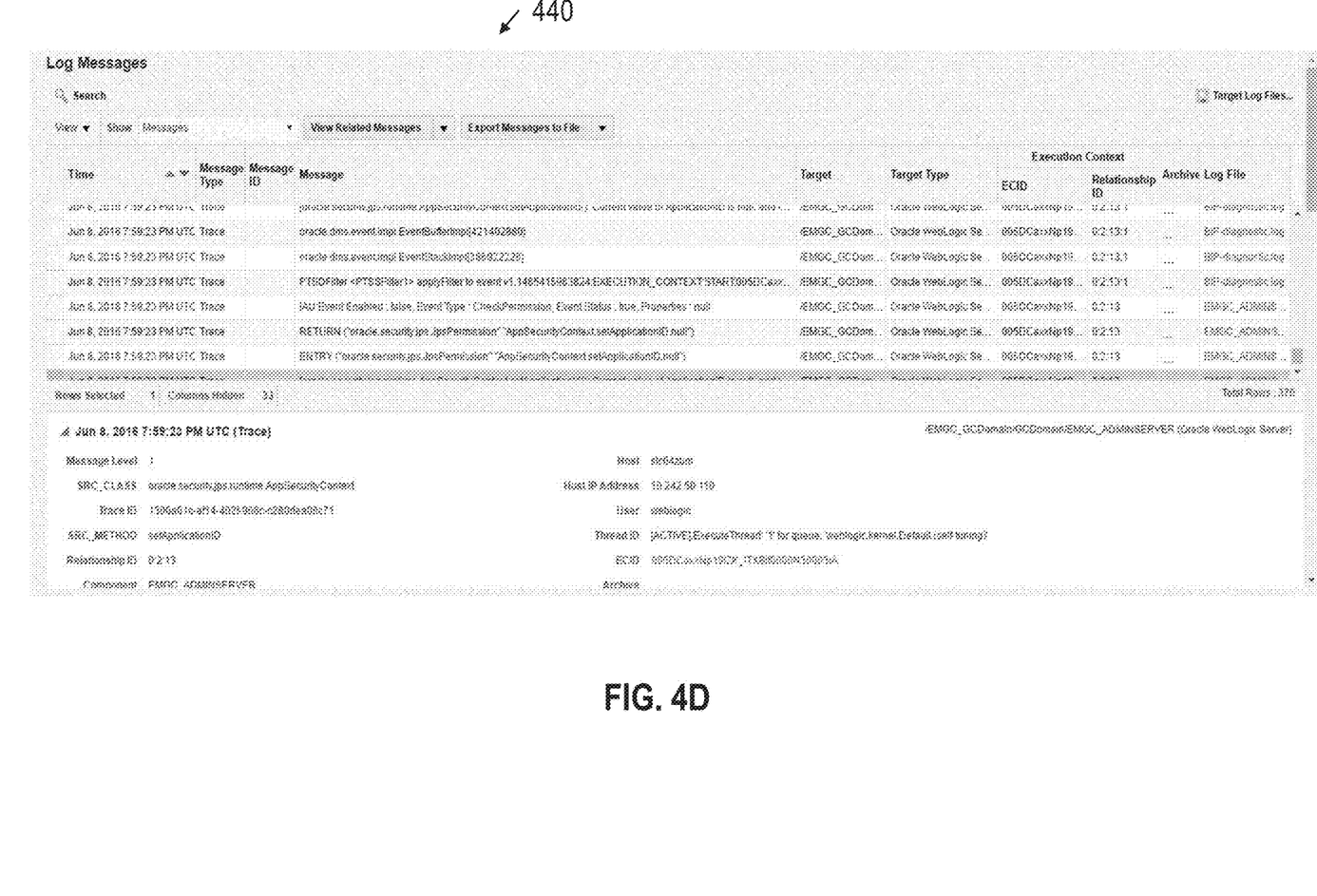
FIG. 4D illustrates an example interface for viewing trace data in accordance with one or more embodiments.

FIG. 4D illustrates an example interface 440 for viewing trace data in accordance with one or more embodiments. Interface 440 provides various graphical user interface objects through which a user may browse and view different trace messages. The user may select trace messages of interest to drill down and view more details about the message in a viewing pane. The viewing pane may depict various attributes associated with the message including, without limitation, a time the message was generated, source information for a source that generated the message (e.g., a classification of the source, a hostname associated with the source, host IP address associated with the source), a trace identifier that identifies the trace session with which the trace message is associated, a user identifier for a user that triggered the trace message, and topological data identifying topological information for the target that generated the message.

In one or more embodiments, the tracing options that are presented for a given interface may vary depending on the target types and/or target dependencies referred to by a given tracing profile. For example, for an "infrastructure" tracing profile, it may not make sense to provide the user with tracing options that are specific to the database tier. Thus, these options may not be displayed to a user that is navigating this bucket. If the user then switches to a "database" tracing profile or some other profile that refers to target types within the database tier, then these options may subsequently be displayed. In addition or alternatively, tracing options that are displayed may vary depending on the role of the user that is defining the tracing options. For instance, a first set of tracing options may be displayed for a database administrator, and a different set of options may be displayed for an application administrator. Thus, the interfaces that are displayed may vary based on a variety of factors, which may vary depending on the particular implementation.

5. Topology and Tracing Profile Updates

In one or more embodiments, tracing system 160 reacts to changes in the topology of the multi-tier application. For example, a tracing session may be executed at time t1 where TP(s) 148 generate trace data for database instance(s) 144. At time t2 (either during the same tracing session or during a different tracing session using the same profile), a second database host may be added. In response, the tracing profile may be analyzed to determine whether to generate trace data for database instances executing on the database host. If it is determined that trace data should be provided (e.g., it is part of the same cluster as DB host 142), then one or more trace providers on the new database host may be enabled. Thus, as target components and relationships are added, removed, or otherwise changed over time, topology monitoring service 163 may detect the changes and trace controller 164 may selectively enable/disable trace providers in accordance with the tracing profile.

In one or more embodiments, the tracing options for a target profile may be updated over time. For instance, at time t1, a tracing session may be initiated using a given tracing profile. At time t2 (either during the active tracing session or in between different sessions using the same tracing profile) a dimensional attribute value may be added, removed, or changed. In response, trace controller 164 may change the trace providers that are enabled/disabled within the system and/or the provider-specific parameters that are being used by the enabled trace providers. As an example, a user may change the set of target types for which trace data should be generated during an active tracing session. In response, trace controller may analyze the topology data and identify target types that no longer satisfy and/or that newly satisfy the specified criteria. For target types, if any, that no longer satisfy the criteria, trace controller 164 may issue a "stopTracing" call to the corresponding trace provider(s). For target types, if any, that satisfy the new criteria, trace controller 164 may issue a "startTracing" call to the corresponding trace provider(s). Any other tracing options may also be changed in a tracing profile over time.

In one or more embodiments, machine-learning techniques are implemented to update the tracing profiles over time. By using machine-learning techniques, tracing system 160 may learn the tracing options that are most effective or most popular for a given tracing profile. For example, tracing system 160 may analyze the tracing options that are selected most frequently by database administrators for a given tracing profile. Based in part on the options that were selected and the recency of the selections, the tracing profile may update the default options to reflect the most common selections within a threshold timeframe. As another example, tracing system 160 may analyze feedback from a user that indicates which tracing providers generated trace data that was relevant to resolve a particular issue and which tracing providers generated irrelevant data. Tracing system 160 may then update the tracing providers that are enabled/disabled to select providers that are the most likely to generate trace data that is of interest.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
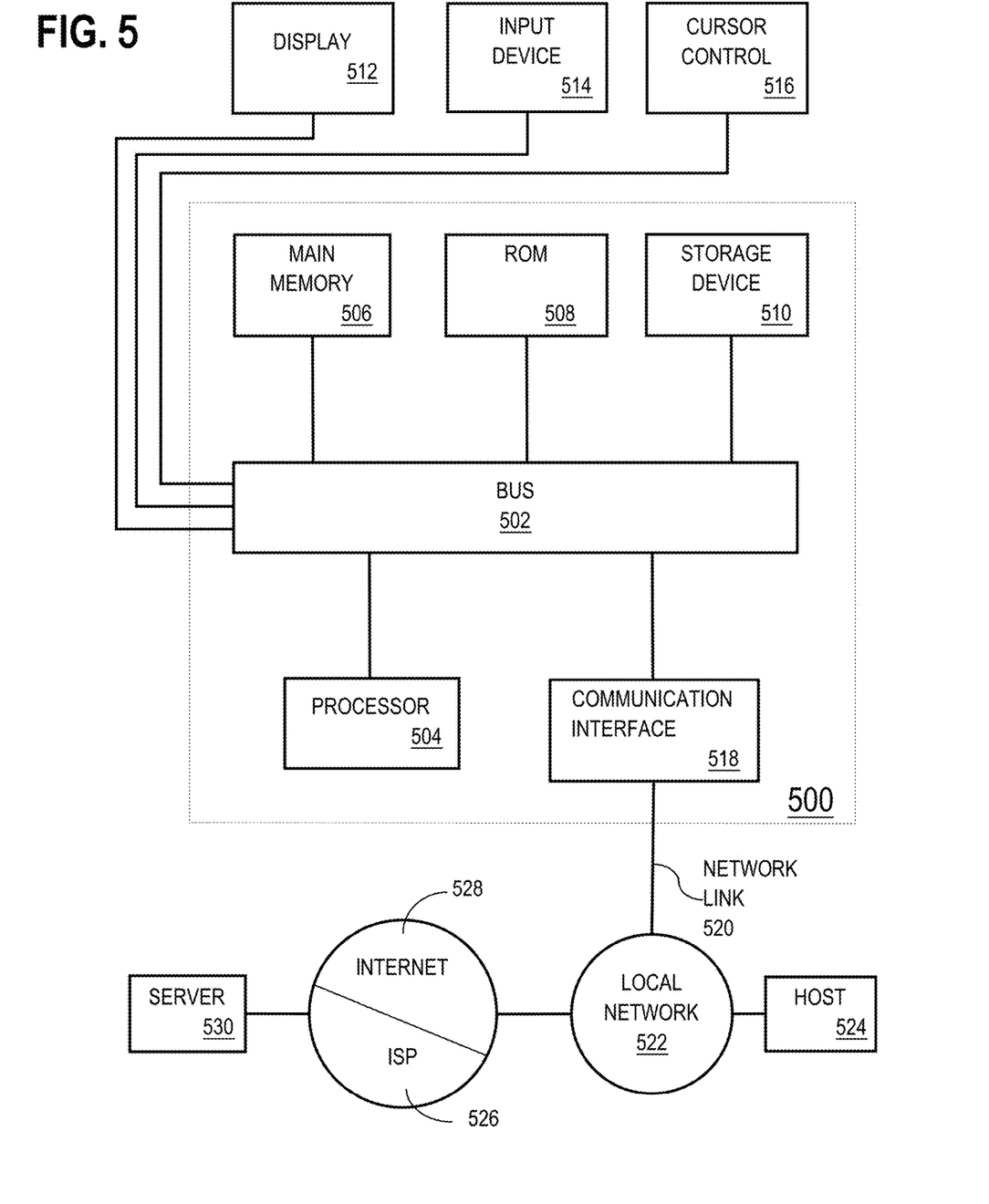
FIG. 5 illustrates an example computer system on which one or more embodiments may be implemented.

For example, FIG. 5 is a block diagram that illustrates computer system 500 upon which one or more embodiments may be implemented. Computer system 500 includes bus 502 or other communication mechanism for communicating information, and hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT), liquid crystal display (LCD), or light-emitting diode (LED), for displaying information to a computer user. Input device 514, which may include physical and/or touchscreen based alphanumeric keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to host computer 524 or to data equipment operated by Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing mapping data that maps different respective roles to different respective tracing options;
    receiving, by a cloud service, a request that invokes an application provided by the cloud service;
    responsive to receiving the request:
        determining a particular role associated with a user that originated the request;
        identifying, within the mapping data, a set of tracing options that are mapped to the particular role of the user that originated the request, wherein the set of tracing options identify a set of target types and target dependencies;
        selecting, based at least in part on the set of tracing options that are mapped to the particular role, a first set of trace providers to enable and a second set of trace providers to disable;
        enabling the first set of trace providers such that the first set of trace providers generate trace messages while the cloud service is processing the request; and
        disabling the second set of trace providers such that the second set of trace providers do not generate trace messages while the cloud service is processing the request.

2. The method of claim 1, wherein the first set of trace providers are further selected based at least in part on a topology associated with the cloud service.

3. The method of claim 1, wherein the application is a multi-tier application and the first set of trace providers are further selected based at least in part on what tiers are being monitored for the application.

4. The method of claim 1, further comprising:
    receiving, by the cloud service, a second request that invokes a second type of application provided by the cloud service;
    responsive to the second request, disabling at least one trace provider in the first set of trace providers and enabling at least one trace provider in the second set of trace providers.

5. The method of claim 1, further comprising identifying provider-specific parameters for at least a particular trace provider in the first set of trace providers; and passing the provider-specific parameters to the particular trace provider such that once enabled the particular trace provider generates trace messages in accordance with the provider-specific parameters.

6. The method of claim 5, wherein the provider-specific parameters include a trace-logging level, wherein the provider-specific parameters configure the particular trace provider to generate trace messages at a different trace-logging level than at least one other trace provider in the first set of trace providers.

7. The method of claim 1, wherein the first set of trace providers includes a metric sensor, a logger, and an event duration sensor.

8. One or more non-transitory computer-readable media storing instructions, which when executed by one or more processors, cause operations comprising:
storing mapping data that maps different respective roles to different respective tracing options;
receiving, by a cloud service, a request that invokes an application provided by the cloud service;
responsive to receiving the request:
determining a particular role associated with a user that originated the request;
identifying, within the mapping data, a set of tracing options that are mapped to the particular role of the user that originated the request, wherein the set of tracing options identify a set of target types and target dependencies;
selecting, based at least in part on the set of tracing options that are mapped to the particular role, a first set of trace providers to enable and a second set of trace providers to disable;
enabling the first set of trace providers such that the first set of trace providers generate trace messages while the cloud service is processing the request; and
disabling the second set of trace providers such that the second set of trace providers do not generate trace messages while the cloud service is processing the request.

9. The one or more non-transitory computer-readable media of claim 8, wherein the first set of trace providers are further selected based at least in part on a topology associated with the cloud service.

10. The one or more non-transitory computer-readable media of claim 8, wherein the application is a multi-tier application and the first set of trace providers are further selected based at least in part on what tiers are being monitored for the application.

11. The one or more non-transitory computer-readable media of claim 8, wherein the instructions further cause operations comprising:
receiving, by the cloud service, a second request that invokes a second type of application provided by the cloud service;
responsive to the second request, disabling at least one trace provider in the first set of trace providers and enabling at least one trace provider in the second set of trace providers.

12. The one or more non-transitory computer-readable media of claim 8, wherein the instructions further cause operations comprising: identifying provider-specific parameters for at least a particular trace provider in the first set of trace providers; and passing the provider-specific parameters to the particular trace provider such that once enabled the particular trace provider generates trace messages in accordance with the provider-specific parameters.

13. The one or more non-transitory computer-readable media of claim 12, wherein the provider-specific parameters include a trace-logging level, wherein the provider-specific parameters configure the particular trace provider to generate trace messages at a different trace-logging level than at least one other trace provider in the first set of trace providers.

14. The one or more non-transitory computer-readable media of claim 8, wherein the first set of trace providers includes a metric sensor, a logger, and an event duration sensor.

15. A system comprising:
one or more hardware processors;
one or more non-transitory computer-readable media storing instructions, which when executed by one or more processors, cause:
storing mapping data that maps different respective roles to different respective tracing options;
receiving, by a cloud service, a request that invokes an application provided by the cloud service;
responsive to receiving the request:
determining a particular role associated with a user that originated the request;
identifying, within the mapping data, a set of tracing options that are mapped to the particular role of the user that originated the request, wherein the set of tracing options identify a set of target types and target dependencies;
selecting, based at least in part on the set of tracing options that are mapped to the particular role, a first set of trace providers to enable and a second set of trace providers to disable;
enabling the first set of trace providers such that the first set of trace providers generate trace messages while the cloud service is processing the request; and
disabling the second set of trace providers such that the second set of trace providers do not generate trace messages while the cloud service is processing the request.

16. The system of claim 15, wherein the first set of trace providers are further selected based at least in part on a topology associated with the cloud service.

17. The system of claim 15, wherein the application is a multi-tier application and the first set of trace providers are further selected based at least in part on what tiers are being monitored for the application.

18. The system of claim 15, wherein the instructions further cause:
receiving, by the cloud service, a second request that invokes a second type of application provided by the cloud service;
responsive to the second request, disabling at least one trace provider in the first set of trace providers and enabling at least one trace provider in the second set of trace providers.

19. The system of claim 15, wherein the instructions further cause: identifying provider-specific parameters for at least a particular trace provider in the first set of trace providers; and passing the provider-specific parameters to the particular trace provider such that once enabled the particular trace provider generates trace messages in accordance with the provider-specific parameters.

20. The system of claim 15, wherein the first set of trace providers includes a metric sensor, a logger, and an event duration sensor.

* * * * *